July 11, 1950  D. T. DOBBINS  2,514,749
AIRCRAFT PROPULSION MECHANISM
Filed Jan. 22, 1945  2 Sheets-Sheet 2
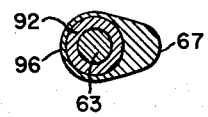
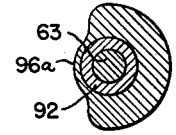
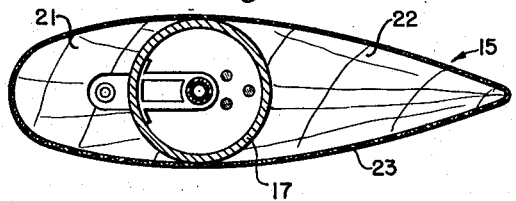
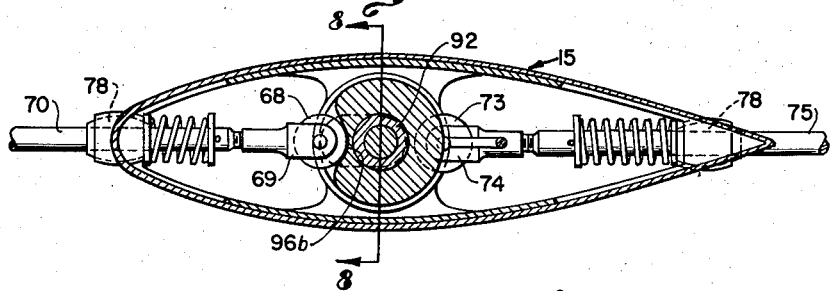
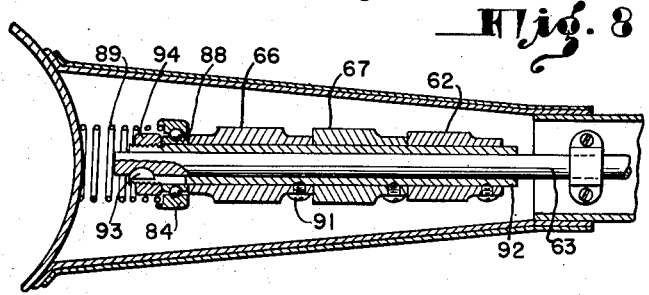
INVENTOR.
DAVID T. DOBBINS
BY
ATTORNEY Patented July 11, 1950

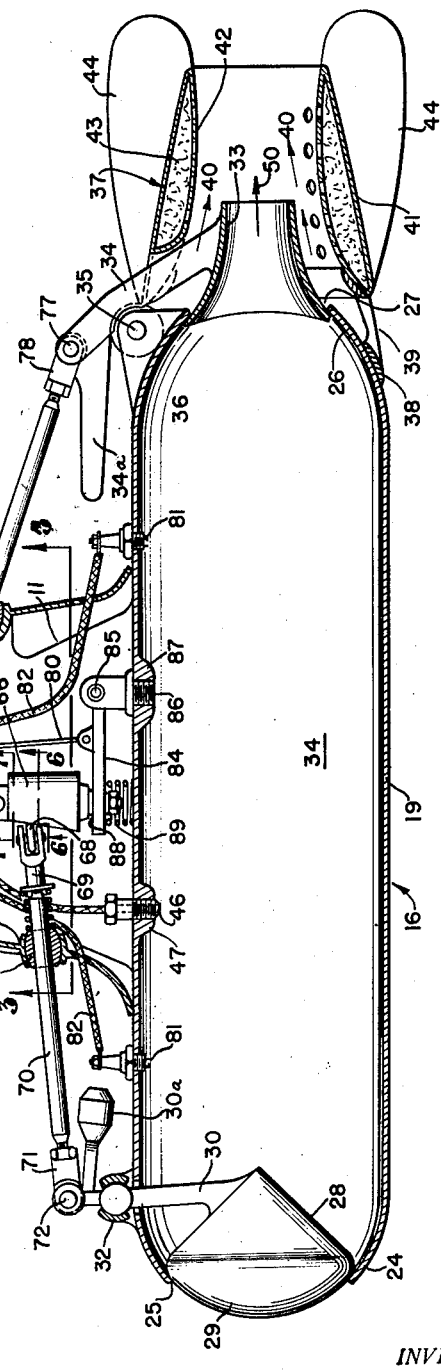
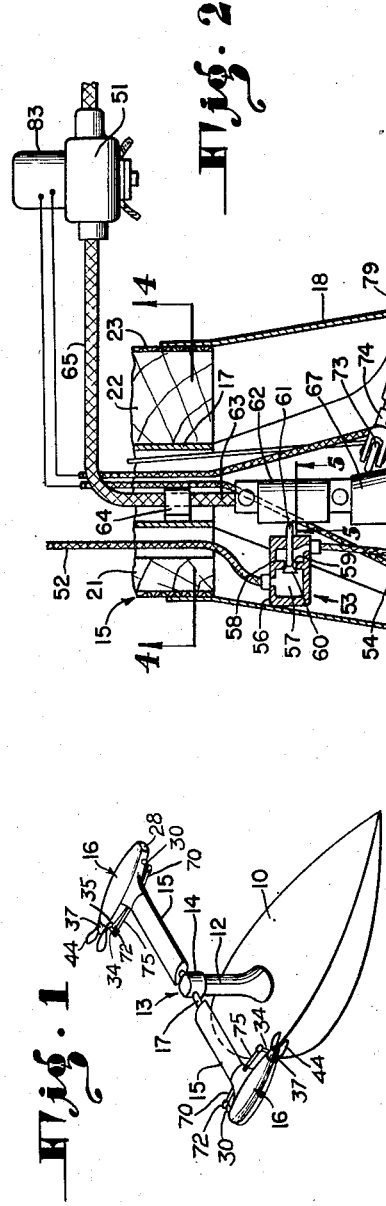

2,514,749

UNITED STATES PATENT OFFICE 2,514,749

AIRCRAFT PROPULSION MECHANISM

David T. Dobbins, Los Angeles, Calif.

Application January 22, 1945, Serial No. 574,016

13 Claims. (Cl. 170—135.4)

This invention relates to propulsion mechanism for aircraft. It is particularly useful in connection with the propulsion of helicopters, and a primary object of the invention is to provide a novel and improved helicopter propulsion mechanism.

A further object of the invention is to provide a helicopter propulsion mechanism which eliminates the necessity for transmission gearing extending upwardly through the posts on which the helicopter rotor is mounted.

Another object of the invention is to provide a helicopter propulsion mechanism adapted to apply the power to the blades of the helicopter rotor where the power is most effective in producing lift, and to substantially eliminate bending moments in the blades near the rotor axis caused by aerodynamic drag against the blades.

A further object of the invention is to provide a jet form of propulsion for a helicopter.

Another object of the invention is to provide an improved jet propulsion motor mechanism, of the type utilizing aerodynamic ram effect for charging air under pressure into a combustion chamber.

Another object is to provide a jet motor having timing mechanism for controlling the alternate ramming of air into a combustion chamber, the mixing of fuel therewith, the explosion of the mixture in the chamber, and the scavenging of the burned gases from the chamber.

A further object of the invention is to provide a helicopter rotor which utilizes its propulsion mechanism to produce a flywheel effect which may be utilized to temporarily sustain the flight of the helicopter in the event of power failure.

Further objects and advantages of the invention will be brought out in the following part of the specification.

Referring to the drawings which are for illustrative purposes only,

Fig. 1 is a perspective view of a helicopter involving the invention;

Fig. 2 is a horizontal sectional view through a jet propulsion motor embodying the invention in the tip of a helicopter rotor blade;

Fig. 3 is a detail sectional view taken on the line 3—3 of Fig. 2;

Fig. 4 is a detail sectional view taken on the line 4—4 of Fig. 2;

Fig. 5 is a detail sectional view taken on the line 5—5 of Fig. 2;

Fig. 6 is a detail sectional view taken on the line 6—6 of Fig. 2;

Fig. 7 is a detail sectional view taken on the line 7—7 of Fig. 2; and

Fig. 8 is a detail sectional view taken on the line 8—8 of Fig. 3.

As an example of one form in which the invention may be embodied, I have shown in the drawings a helicopter having a fuselage 10, a pylon 12, and a rotor 13 journaled on the upper end of the pylon 12.

The rotor 13 comprises a hub 14, a pair of blades 15, and jet propulsion motors 16 on the tips of the blades 15.

The utilization of jet propulsion motors at the tips of the rotor blades has a number of advantages. It applies the power to the blades where they create the greatest drag, i. e., at their outer ends. It locates the motors where they may travel through the air at a speed within the range of high efficiency. It is known, of course, that a jet propulsion device operates at best efficiency upwardly of 500 miles per hour. Such speeds are commensurate with desirable tip speeds for helicopter rotors. The generation of power within the fuselage or at the base of the rotor pylon and the transmission of such power upwardly through the pylon and to the blades is no longer necessary, and the transmission gearing and shafting is thereby eliminated. Since the power is not applied through the hub, the torque reaction or bending moment in the shanks of the blades adjacent the hub, caused by the balancing of the aerodynamic drag on the blades against the torque applied through the hub from the power plant, is eliminated and consequently the blade shanks need be only strong enough to support the weight of the fuselage and its contents.

It is a characteristic of a helicopter that it produces a downflowing column of air in which, in the event of power failure, it will be carried downwardly until such downflow is dissipated. If the helicopter is at a sufficient height, its rotor will ultimately achieve a windmilling action as the craft drops toward the earth subsequent to power failure, which action will arrest its rapid descent and permit it to land without undue damage. However, if it is hovering within two hundred feet at the time of power failure, it is almost sure to crash upon landing, owing to its inability to escape from the aforementioned downflowing column of air which it has created. The flywheel action achieved by the invention permits it to retain sufficient sustentation to escape laterally from the downflowing air column, and thence to pass into the windmilling stage without a sufficiently rapid descent to cause damage. The location of the jet motors at the tips of the blades gives this desired flywheel effect.

Each blade 15 includes a tubular spar 17 which is securely anchored to the hub 14 which is connected through brackets 11 to the cylindrical shell 19 of the jet motors 16. The spars 17 and brackets 11 are sufficiently heavy to carry all the loads to which they are subjected, including the distribution of the propulsive force throughout the length of the blades, the balancing of the weight of the fuselage 10 against the lift of the air against the blades 15, and the absorption of the centrifugal forces developed by the blades 15 and the jet motors 16. The spars 17 also serve as conduits through which control mechanism is extended from a central control point to the respective jet motors.

As shown in Fig. 4, each blade 15 may comprise the spar 17, a leading edge blade section 21 of light solid material, such as spruce, a trailing edge section 22 of balsa wood, and may include (although not necessarily) a skin 23 of fabric or other suitable covering material. The external surfaces of the blade sections 21 and 22 are suitably faired to provide an airfoil cross section.

The jet motors 16 each comprises a shell 19 which may be cylindrical, as shown, or may, in order to reduce drag, be of a more streamlined shape, for example—tear drop shaped, having a faired nose portion 24 provided with an inlet 25 and having a faired tail section 26 provided with an outlet 27. The inlet 25 is periodically closed by a closure 28 having a forward face 29 having a properly streamlined (teardrop leading face) contour adapted to form a faired continuation of the surface 24. The closure 28 is carried by an arm 30 having a pivotal portion 31 pivoted in a bearing socket 32 attached to the shell 19. At the tail of the shell 19 is a jet nozzle 33 which is carried by an arm 34 pivoted at 35 to a bracket 36 on the shell 19, for retraction inwardly of the shell 19. When in its extended position, shown in Fig. 2, the nozzle 33 directs the exhaust of the jets from the combustion chamber 34, formed within the shell 19. When it is retracted inwardly, the nozzle 33 is spaced from the periphery of the opening 27 to define an annular scavenging outlet for spent gases. The nozzle 33 exhausts through a muffler 37 which is supported on the shell 19 by a suitable spider 38. The forward or leading edge of the muffler 37 is spaced from the tail portion 26 of the shell 19 to provide an annular air passage 39, through which air may flow as indicated by the arrows 40 so as to reduce to a minimum the parasitic drag of the muffler 37 and augment the thrust produced by the jet. The external wall 41 of the muffler 37 is faired to the surface of the shell 19, and may decrease gradually in diameter toward the rear edge of the muffler. The inner wall 42 of the muffler is roughly Venturi shaped to provide the proper speed-up in the air-flow 40 between the annular entrance 39 and the rear end of the nozzle 33. The muffler 37 is in the form of an annulus having the cross sectional shape shown, and comprising the walls 41 and 42, which may be separated by a body of sound absorbing material, such as steel wool 43 packed therebetween.

Attached to each muffler 37 are a pair of stabilizer vanes 44, the primary purpose of which is to resist the torque reaction in the blades 15 about the axis of the spars 17.

Fuel is injected into the chamber 34 through a nozzle 46, threaded into a boss 47 in the wall of the shell 19. The fuel is delivered to the nozzle 46 by centrifugal action, from a suitable fuel reservoir (not shown) through a fuel line 52 to a valve 53 which alternately admits the fuel to a line 54 leading to the nozzle 46, and cuts off the fuel flow. The valve 53 comprises a casing 56 having an inlet chamber 57 and an outlet chamber 58 connected by a port 59, which is intermittently opened and closed by a poppet valve 60, the stem 61 of which is engaged by a cam 62. The cam 62, shown in cross section in Fig. 5, is mounted on a shaft 63 which is journaled in bearings 64 in the spars 17. Each shaft 63 is connected by an extension shaft 65, preferably flexible, to a motor 51, through which the two cam shafts are driven in unison.

Mounted on each cam shaft 63 is a pair of cams 66 and 67, the former operating the inlet closure 28 through linkage including a roller 68 engaging the cam 66, a yoke 69 in which the roller 68 is journaled, a push rod 70 on one end of which the yoke 69 is threaded, and a yoke 71 threaded on the other end of the push rod 70 and pivoted at 72 to the outer end of the arm 30, the cam 67 operating the nozzle 33 through linkage comprising a roller 73 engaging the cam 67 and journaled in a yoke 74 which is threaded on one end of a push rod 75, on the other end of which is threaded a yoke 76 pivoted at 77 to the outer end of the arm 37. The push rods 70 and 75 are slidably mounted in bearing bushings 78 which in turn are socketed for universal movement in bearing sockets 79 on the brackets 11.

The cams 66 and 67 are adapted to operate the closure 28 and nozzle 33 in timed relation to the injection of fuel into the chamber 34 so as to produce the following cycle of operations:

Starting with the parts in the positions shown in the drawings, and with a volume of explosive mixture within the chamber 34 burning, expanding and reacting against the closed forward end of the chamber, a jet of gases will be forced out of the nozzle 33, as indicated by the arrow 50. When the force of this jet is expended, the nozzle 33 and closure 28 will move inwardly substantially simultaneously permitting a body of air to be rammed into the forward end of the chamber 34 through the inlet 25 and the spent gases to be scavenged through the outlet 27 and nozzle 33. After a sufficient interval for proper scavenging, the nozzle 33 will return to its position shown in full lines, closing the opening 27. For a brief interval after this closing, the closure 28 will remain opened to permit a body of air to be rammed into the chamber 34 under compression. Simultaneously, a jet of fuel will be injected into the chamber 34 through the nozzle 46. The closure 28 will then close and the fuel will be ignited by a plurality of spark plugs 81 which are connected by conductors 82 extending through the spars 17 to an ignition timer 83 driven from the motor 51 in timed relationship to the cam shaft 63. This will explode the mixture in the chamber 34, thus completing the cycle.

The ratio of the open time of the closure 28 and nozzle 33 to the closed time thereof may be altered by shifting the cams 66 and 67 longitudinally on the cam shaft 63. In order that this may be effected, the cams 66 and 67 are secured, as by means of stud screws 91, to a sleeve 92 which is axially slidable on the shaft 63 and is drivingly connected thereto by blind or keyed connection 93. The stud screws 91 permit adjustment of the cams on the sleeve 92. The cam 62 may also be mounted on the sleeve 92 as shown, although not necessarily so.

Centrifugal force tends to move the cam assembly toward the jet motors 16. This movement is yieldingly resisted by a spring 89 which is engaged between the shell 19 and the outer race of an end thrust bearing 88, the inner race of which is mounted upon the sleeve 92 between the cam 66 and a retainer nut 94, threaded on the end of the sleeve 92. The said outer race of the bearing 88 comprises an arm 84 which is fulcrumed at 85 on a post 86 threaded into a boss 87 in the shell 19. A Bowden wire 80, extending to a suitable control point, permits manual adjustment of the cam assembly in the direction in which it is urged by the spring 89, so as to modify the automatic adjustment which is attained by the balance between the compression of the spring 89 and the centrifugal force acting against the cam assembly. The automatic control is such that at low speeds, as when starting, the rollers 68 and 73 will ride against the outer region (toward the motors 16) of the cams 66 and 67, and as the speed increases, the cams will move outwardly so that the rollers will ride against the inner region of the cams, as shown in Fig. 2. Correspondingly, at low speeds, the valve members 29 and 33 will remain open for a larger portion of the cycle of operation than at high speed, thus providing for maximum efficiency of operation of the jet motors. At low speeds, best efficiency is obtained by employing a relatively long period of scavenging and charging operations and a relatively short period of combustion, whereas, the reverse is true at high speeds, when the impact of the air at the inlet 25 is relatively high.

In order to attain the changed ratio of jet action to charging and scavenging, the cams 66 and 67 are varied in cross sectional shape from their inner to their outer ends. The cross sectional shape at the inner end of each cam is shown in Fig. 7. The low portion 96 of the cam at this end extends through an arc of approximately 225°, and the closure 28 and nozzle 33 will remain in their closed positions for a corresponding portion of the cycle. In the central region of the cam, shown in cross section in Fig. 6, the low portion 96a of the cam extends through an arc of approximately 90°, and the closure on the nozzle will remain closed a corresponding portion of the cycle. At the outer ends of each cam, the cross sectional shape, shown in Fig. 3, is such that the low portion 96b of the cam occupies only a small fraction of the circumference of the cam, and consequently the closure and nozzle will remain closed for a very short portion of the cycle. The spring 89 is adapted to move the cams toward the rotor axis sufficiently to cause the rollers 68 and 73 to operate against the outer end portions of the cams at starting speed. The majority of the cycle of jet action is, at such speeds, occupied in charging and scavenging, and the jet action is confined to a small portion of the cycle. This is necessary owing to the relatively low speed of the air entering the inlet 25 at the low operating speed. As the rotor speed rises, however, the air speed at the inlet will correspondingly increase, making it possible for the scavenging and charging to take place more rapidly. The jet action, however, will continue to take place at substantially the same rate (accelerated, however, by the increased power and efficiency of explosion derived from the greater compressive action at higher speeds) and consequently, it is necessary that the jet action occupy an increasingly greater percentage of the cycle of operation as the speed of the rotor increases. Thus the highest efficiency is obtained at flying speed.

The Bowden wire 90 may be utilized as a means to pull the arm 84 inwardly against the centrifugal action of the cam so as to throttle down the speed. Throttling can, of course, also be accomplished by reducing the fuel supply, utilizing any suitable fuel control mechanism which may be of a conventional character, and is therefore not illustrated herein. In order that the action of the nozzle 33 and closure 29 may not be influenced by centrifugal force, the arms 34 and 30 are counterbalanced with weights 34a and 30a.

Throttle control of the action of the jet motors is obtained primarily by controlling the speed of the timer drive motor 51, which is a variable speed motor.

The invention contemplates employment of the propulsion mechanism herein described in a rotor in which the blades 15 are adjustable about the axis of the spars 17, for the purpose of changing the angle of attack and controlling the operation of the rotor. The longitudinal axes of the jet motors 16 with reference to their plane of rotation will be correspondingly changed, giving the advantage of adding a component of lift to the rotational force produced by the motors, when the blades 15 are tilted at a definite angle of attack.

The invention may be embodied in a power plant used for purposes other than aircraft propulsion. For example, my improved motor may be mounted on, and employed to drive, a swinging arm which in turn may rotate a power shaft which is employed to drive any type of power driven mechanism.

I claim as my invention:

1. An aircraft propulsion mechanism comprising: a propelling blade embodying a spar extending longitudinally therethrough and serving as a load sustaining member, a cam case attached to said spar and forming a continuation of said blade, a jet propulsion motor embodying a shell attached to said cam case with its axis substantially at right angles to the axis of said spar, a cam shaft extending through said spar, cams on said cam shaft within said cam case, said shell having an inlet at its forward end and an outlet at its rear end, a movable closure for said inlet, a movable nozzle for said outlet, and operative connections between said cams and said closure and nozzle for intermittently moving said closure and nozzle from positions closing said inlet and outlet and providing for jet action of a combustible mixture burned within said shell, to positions opening said inlet and outlet and providing for scavenging of exhaust gases and charging of a fresh mixture within said shell.

2. Helicopter propulsion mechanism comprising: a sustaining rotor embodying a lifting blade incorporating a spar extending longitudinally therethrough and a hub to which said spar is adapted to transmit the lifting force of the blade, a jet propulsion motor carried by said spar and comprising an elongated shell defining a combustion chamber therewithin, said shell being arranged with its longitudinal axis substantially at right angles to the axis of said spar, a cam case interposed between said spar and said shell, a cam shaft extending through said blade, cams carried by said shaft within said cam case, said shell having at its forward end an inlet opening and at its rear end a jet nozzle, a closure for said inlet, means including said cam for transmitting to said closure, intermittent opening and closing movement, a fuel injection nozzle for injecting fuel into said chamber, means including a cam on said shaft, a valve operated by said cam, and a connection between said valve and said injection nozzle for controlling the intermittent flow of fuel to said nozzle, in timed relationship to the movement of said closure, ignition means for exploding a fuel mixture in said chamber, and means including control mechanism located between said hub and the load carried thereby, for rotating said cam shaft, delivering fuel to said valve, and intermittently energizing said ignition means in timed relation to the operation of said injection nozzle and closure, said last means including connections extending through said spar.

3. Helicopter propulsion mechanism comprising: a rotor embodying a blade and a jet propulsion motor carried by said blade in a position to drive said blade in its lifting direction of rotation, a cam shaft extending longitudinally of said blade and having a cam thereon, said jet propulsion motor including a shell defining a combustion chamber and having at its forward end an inlet, a closure for said inlet, means including said cam and connections between said cam and said closure for intermittently opening and closing said closure so as to first charge said chamber with a volume of compressed air and to then close said chamber for the explosion of a charge of fuel mixed with said volume of compressed air, said cam being of varying cross sectional shape from end to end so as to vary the ratio between the opening and closing portions of the cycle of operation of said closure, said cam being shiftable under the effect of centrifugal force, and means yieldingly opposing said axial shifting in such a manner as to automatically vary said ratio in step with the speed of rotation of said rotor.

4. A jet propelled rotor including an arm and a jet motor carried thereby at a distance from the axis of rotation thereof, said motor comprising a shell having an inlet opening at its leading end and a nozzle at its trailing end, a closure for said inlet opening, means for intermittently opening and closing said closure, said means including a cam disposed on an axis generally radial with reference to said rotor axis and shiftable along its axis under the effect of centrifugal force, and means yieldingly resisting said shifting movement, said cam having a cross sectional contour that is varied from end to end so as to vary the ratio between the periods of opening and closing movement of said closure as the cam is shifted along its axis, means on which said nozzle is mounted for movement into said shell so as to provide an annular scavenging opening in the trailing end of said shell in addition to the nozzle opening, and means including a cam movable with said first mentioned cam, for controlling said nozzle moving means.

5. A power plant comprising an arm, means on which said arm is mounted for rotating movement in a circular path, a jet motor mounted on said arm in a position to rotate the same in said path, said motor comprising a shell having an inlet opening at its leading end and a nozzle at its trailing end, a closure for said inlet opening, means for intermittently opening and closing said closure so as to provide for a charging and scavenging stage of operation followed by a combustion stage, said means including a cam disposed on an axis generally radial with reference to said circular path and shiftable along its axis under the effect of centrifugal force, and means yieldingly resisting said shifting movement, said cam having a cross sectional contour that is varied from end to end so that by shifting as aforesaid, it will provide a longer period for the scavenging-charging stage at lower speeds than at higher speeds.

6. A jet propulsion motor comprising an elongated shell defining therewithin a combustion chamber, means for feeding fuel into said chamber, means for igniting a fuel charge in said chamber, said shell having at its forward end an inlet and at its rear end an outlet, a closure for said inlet, a jet nozzle for said outlet, means by which said closure and jet nozzle are mounted on said shell for retracting movement into the shell, an operating cam, and connections between said cam and said mounting means for moving said closure to an open position in which said inlet is opened to permit the entry of a volume of air into said chamber for scavenging spent gases of combustion therefrom, through said outlet around said nozzle, then moving said nozzle to a position where it closes said outlet except for the nozzle orifice to effect compression of the air moving into the chamber, and to then close said closure so as to provide a substantially closed chamber in which an explosive mixture may be burned, react against said closure, and produce a jet exhaust through said nozzle.

7. A jet propulsion motor comprising a shell defining therewithin a combustion chamber, means for feeding fuel into said chamber, means for igniting a fuel charge in said chamber, said shell having at its forward end an inlet and at its rear end an outlet, a closure for said inlet, a jet nozzle for said outlet, means by which said closure and jet nozzle are mounted on said shell for movement between closed and open positions; and operating means adapted to move said nozzle to a position where it closes said outlet except for the nozzle orifice to effect compression of the air moving into the chamber, to then move said closure to its closed position so as to provide a substantially closed chamber in which an explosive mixture may be burned, react against said closure, and produce a jet exhaust through said nozzle, and to subsequently move said closure and nozzle to their open positions so as to permit an inrush of air and the scavenging thereby of the spent gases through said outlet around said nozzle.

8. A power plant comprising an arm, means on which said arm is mounted for movement in a rotational path, a jet motor mounted on said arm in a position to rotate the same in said path, means for controlling the flow of air through said jet motor, means for intermittently operating said airflow control means, said last means including a cam supported by said arm and disposed on an axis generally alined with said arm and shiftable along said axis, said cam having a cross-sectional contour that is varied from end to end so as to vary the timing of said intermittent flow control operation.

9. A power plant comprising an arm, means on which said arm is mounted for rotation in a circular path, a jet motor mounted on said arm in a position to rotate the same in said path, said motor comprising a shell having means for controlling the flow of air therethrough so as to provide a charging and scavenging stage of operation followed by a combustion stage, and a cam for operating said airflow controlling means, said cam being disposed on an axis generally radial with reference to said rotational path and shiftable along said axis under the effect of centrifugal force, and means yieldingly resisting said shifting movement, said cam having a cross-sectional contour that is varied from end to end so that, by shifting as aforesaid, it will vary the timing of the airflow control in a manner to provide a longer period for the charging-scavenging stage at lower speeds than at higher speeds.

10. In a jet motor, a shell defining a combustion chamber and having an inlet and an outlet provided with a nozzle that is shiftable to enlarge the outlet for scavenging, means for feeding fuel into said combustion chamber, means for igniting a fuel charge in said chamber, a valve for intermittently closing said inlet, means for moving said valve and nozzle to intermittently permit an inrush of air into the chamber, a subsequent explosion of a combustible mixture in the chamber, and a subsequent scavenging through the enlarged outlet, and ignition means for intermittently igniting an explosive mixture in the chamber in timed relationship to the operation of said valve means.

11. In a jet motor, a shell defining a combustion chamber and having an inlet and an outlet, a valve for intermittently closing the inlet, a nozzle shiftable between a position in which the full discharge from the chamber must be through the nozzle to a position enlarging the outlet for scavenging, means for opening and closing said valve and for shifting said nozzle between its said positions in timed relation, ignition means for igniting a combustible mixture in the chamber in timed relationship to the operation of said valve and nozzle, and means for injecting fuel into the chamber in timed relationship to the operation of the valve and nozzle.

12. Helicopter propulsion mechanism comprising: a sustaining rotor embodying a lifting blade incorporating a tubular spar extending longitudinally therethrough and a hub to which said spar is adapted to transmit the lifting force of the blade, a jet propulsion motor carried directly by the outer end of said spar and comprising a shell defining a combustion chamber therewithin, means for controlling air flow through said combustion chamber, means including a cam for operating said air flow control means, a fuel injection nozzle for injecting fuel into said chamber, a valve for controlling an intermittent flow of fuel to said nozzle, means for operating said valve in timed relationship to the movement of said air flow control means, ignition means for exploding a fuel mixture in said chamber, and means including control mechanism located between said hub and a load carried thereby, together with transmission means extending through said spar, for actuating said closure operating means and said valve operating means, for intermittently energizing said ignition means in timed relation to the operation of said injection nozzle enclosure, and for delivering fuel to said valve.

13. A jet motor comprising a shell defining a combustion chamber, the shell having an inlet at its leading end and a nozzle at its trailing end, the nozzle being mounted on the shell for movement between a closed position in which it provides a jet discharge outlet and an open position in which there is defined between said nozzle and said outlet, an annular opening for the discharge of gases of combustion, a closure for said inlet, means on which said closure is mounted for movement between inlet opening and inlet closing positions, means for operating said closure and said nozzle in timed relation so as to provide a charging and scavenging stage followed by a combustion stage of operation, and means for varying the relation between the timing of said closure and that of said nozzle automatically in response to changes in the speed of movement of said jet motor, whereby to increase the ratio of the period of the combustion stage to the period of the charging-scavenging stage as the speed of travel increases.

DAVID T. DOBBINS.

REFERENCES CITED

The following references are of record in the file of this patent:

UNITED STATES PATENTS

| Number | Name | Date |
|---|---|---|
| 684,743 | Burger | Oct. 15, 1901 |
| 1,263,475 | Shepard | Apr. 23, 1918 |
| 1,287,049 | Kramer | Dec. 10, 1918 |
| 1,347,125 | Schneider | July 20, 1920 |
| 1,375,601 | Morize | Apr. 19, 1921 |
| 1,669,758 | Isacco, et al. | May 15, 1928 |
| 1,820,946 | Pitcairn | Sept. 1, 1931 |
| 1,897,092 | Weir | Feb. 14, 1933 |
| 1,980,266 | Goddard | Nov. 13, 1934 |
| 2,003,292 | Holzwarth | June 4, 1935 |
| 2,023,760 | Dornier | Dec. 10, 1935 |
| 2,142,601 | Bleecker | Jan. 3, 1939 |
| 2,330,056 | Howard | Sept. 21, 1943 |
| 2,395,919 | Sundell | Mar. 5, 1946 |
| 2,397,357 | Kundig | Mar. 26, 1946 |
| 2,433,107 | Forsyth | Dec. 23, 1947 |
| 2,438,151 | Davis | Mar. 23, 1948 |

FOREIGN PATENTS

| Number | Country | Date |
|---|---|---|
| 227,151 | Great Britain | Jan. 12, 1925 |
| 366,450 | Great Britain | July 30, 1930 |
| 47,909 | Netherlands | Mar. 15, 1940 |
| 544,834 | Germany | Feb. 29, 1932 |
| 608,087 | France | Apr. 10, 1926 |
| 666,875 | Germany | Oct. 29, 1938 |
| 690,637 | France | June 24, 1930 |